May 6, 1930.  C. C. HANSEN  1,757,084
AIR LINE OILER
Filed March 24, 1927

INVENTOR.
Charles C. Hansen.
BY Herbert S. Ogden
HIS ATTORNEY

Patented May 6, 1930

1,757,084

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

AIR-LINE OILER

Application filed March 24, 1927. Serial No. 177,954.

This invention relates to oiling devices, but more particularly to an air line oiler adapted to be connected in a pressure fluid supply line leading from a source of pressure fluid supply to a machine intended to be actuated thereby.

The objects of the invention are to insure an adequate and uniform supply of lubricant to fluid pressure actuated machines during their entire period of operation, and to prevent frequent interruptions in the operation of such machines for the purpose of introducing lubricant thereto.

Other objects will be in part obvious and in part pointed out hereinafter.

In the drawings illustrating a preferred form of the invention,

Figure 2:
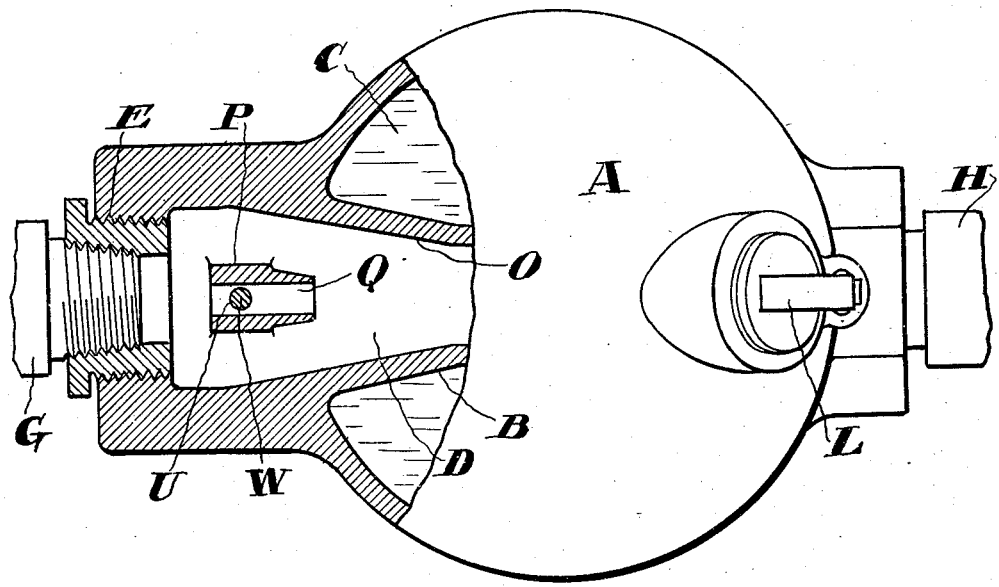
Figure 2 is a plan view partly in section taken through Figure 1 on the line 2—2 looking in the direction indicated by the arrows.
Figure 1:
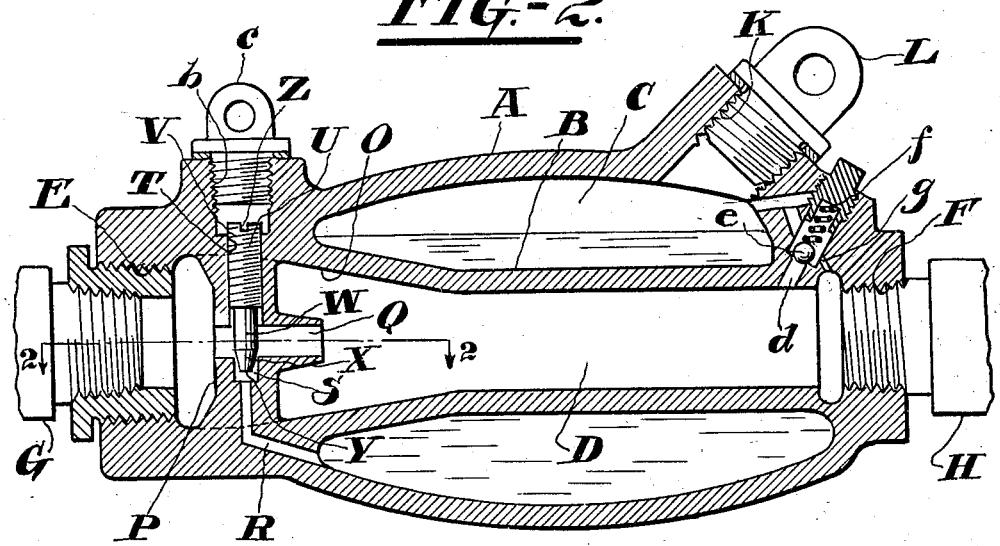
Figure 1 is a longitudinal sectional view of the oiler.

Referring to the drawings, A designates the casing having in this instance a longitudinal tubular wall B which divides the casing A into a reservoir C for oil or other lubricant, and a main passageway D. The ends of the passageway D are in this instance provided with threads E and F to enable the casing A to be connected to sections G and H respectively of a hose line leading from a source of pressure fluid supply to the machine (not shown), such as a rock drill or motor intended to be actuated thereby. Preferably a threaded opening K is provided in the casing for the introduction of lubricant into the reservoir C and this opening K is normally sealed by a filler plug L.

In accordance with the present invention, the passageway D is provided with a flared portion O preferably near one end of the passageway and also at one end of the reservoir C. Extending transversely through the passageway D is a bridge P formed integrally with the casing A. The bridge P is located in the flared portion O to assure the unrestricted flow of pressure fluid throughout all points of the passageway D. The bridge P is provided with a passage Q of suitable cross sectional area which is preferably so located that its longitudinal axis coincides with that of the passageway D to obtain maximum velocity of the pressure fluid through the said passage Q.

Communication between the passage Q and the reservoir C is afforded by a passage R in the bridge P and the wall of the casing A. At the outlet opening of the passage R is a recess S preferably of considerably larger cross sectional area than the passage R and through which recess the passage R communicates with the passage Q.

Suitable means are provided for controlling the volume of oil delivered from the reservoir C through the passage R into the passage Q. To that end a threaded aperture T is formed in the bridge P coaxially with the recess S to receive a needle valve U having a threaded portion V and a smooth end W normally extending into the recess S. The free end X of the smooth portion W of the needle valve is in the form of a frustrum of a cone and therefore has a flat end surface Y which is of sufficiently large diameter to cover the outlet opening of the passage R.

The needle valve U is adjustable and has at its outer end a slot Z for the insertion of a screw driver or other suitable instrument whereby the needle valve may be screwed to the desired position.

In order to render the needle valve readily accessible from the exterior of the casing, a threaded recess $b$ is formed at the outer end of the threaded aperture T. This recess is of somewhat larger diameter than the threaded aperture T and is normally closed by a plug $c$ which forms a seal for said recess $b$ to prevent leakage of pressure fluid or oil or both to the exterior of the casing A.

In the present instance the casing A is provided with a passage $d$ at its other end for the admission of pressure fluid into the reservoir C. The passage $d$ is of ample area to insure an immediate flow of pressure fluid into the reservoir C upon the introduction of pressure fluid into the passageway D. Inasmuch, however, that the passage $d$ is of large cross sectional area, it is preferred that it should be closed immediately upon the admission of pressure fluid into the reservoir. For that purpose a ball valve *e* is disposed in the passage *d* and is actuated by a spring *f* for closing the said valve whenever the pressure in the reservoir and the pressure of the spring substantially equals that of the pressure fluid in the passageway D. In order, however, to insure a constant diminished flow of pressure fluid from the passageway D into the reservoir C at all times during the presence of such pressure fluid in the passageway D, a conduit *g* of considerably smaller cross sectional area than the passage *d* is formed in the casing A and leads from the passageway D to communicate with the passage *d* rearwardly of the ball valve *e*. In this way the pulsations occurring in the passageway D, due to the cut off and admission of pressure fluid into the machine actuated by the pressure fluid, will be constantly transmitted to the oil in the reservoir so that a slight unbalancing effect is obtained to advance the oil from the reservoir through the passage R and the passage Q into the main passageway D.

Preferably the casing A is connected in the hose line in such manner that the pressure fluid will enter the passageway D through the flared portion O of said passageway. With the casing A thus connected, immediately upon the admission of pressure fluid into the passageway D, the ball valve *e* will be unseated and pressure fluid will flow through the passage *d* into the reservoir C. After sufficient pressure fluid has entered the reservoir C to substantially equal the pressure in the passageway D, the valve *e* will be closed by the spring *f* and thus prevent any further admission of pressure fluid through the inlet opening of the passage *d*.

When the tool intended to be actuated by the pressure fluid is set in operation, the pressure in the passageway D will drop slightly below that in the reservoir, thus creating a slight unbalancing effect which will raise the oil in the reservoir through the passage R into the passage Q, thence into the passageway D. After the valve *e* is closed, a sufficient amount of pressure fluid will flow into the passage *d* through the conduit *g* to insure ample pressure on the surface of the oil in the reservoir.

From the foregoing description it will be seen that the oil is admitted directly to the center of the current flowing through the passageway D, thus preventing precipitation of the oil against the walls of the hose line. This is a desirable feature in devices of this character since it insures an adequate supply of lubricant to the tool immediately upon starting thereof.

As hereinbefore stated the needle valve U is adjustable with respect to the outlet opening of the passage R which it controls. Therefore, whenever it is desired to increase the flow of oil through the passage R, or when oil of high viscosity is being used, the needle valve U may be unscrewed to increase the area of the opening around the end X of the valve. On the other hand, when oil of low viscosity is being supplied to the tool, the needle valve U may be adjusted to decrease the area around the end of the valve to reduce the volume of oil delivered into the passage Q.

The present invention has been found to function satisfactorily in any position in which the casing A may be placed in practice. The ideal position for the casing, however, is one corresponding to that illustrated in the drawings, although the casing may be tilted at either end in a vertical plane, and an adequate supply of oil may always be supplied to the tool, since, when the casing occupies a vertical position with the flared end of the passageway D at the top, pressure fluid will flow through the passage R into the reservoir and the oil will be delivered through the conduit *g* into the passageway D. Ordinarily, however, the course of flow of the oil from the reservoir into the passageway D and the flow of pressure fluid from the passageway D into the reservoir will be through the channels previously described.

I claim:

1. An air line oiler comprising a casing having an internal tubular wall dividing the casing into a reservoir and a passageway, said passageway being flared at one end, a bridge transversely through the passageway having a passage for conveying oil from the reservoir into the passageway, a needle valve associated with the passage for controlling the flow of oil therethrough, a passage in the casing for admitting pressure fluid from the passageway into the reservoir, a spring pressed valve for closing the last said passage whenever the pressure in the reservoir substantially equals that in the passageway, and a conduit in the casing constantly supplying pressure fluid to the last said passage rearwardly of the valve.

2. An air line oiler comprising a casing, a wall dividing said casing into an oil reservoir and a main passageway, said casing having passages affording communication between the extremities of the reservoir and the passageway, adjustable means cooperating with one passage for controlling the volume of oil therethrough, a spring pressed valve in another passage for closing said passage whenever the pressure in the reservoir approaches the value of the pressure in the passageway, and a conduit in the casing constantly supplying pressure fluid to the last said passage at a point rearwardly of the spring pressed valve when said valve is closed, said conduit also serving to convey oil from the reservoir into the main passageway in one position of the oiler.

In testimony whereof I have signed this specification.

CHARLES C. HANSEN.